UNITED STATES PATENT OFFICE

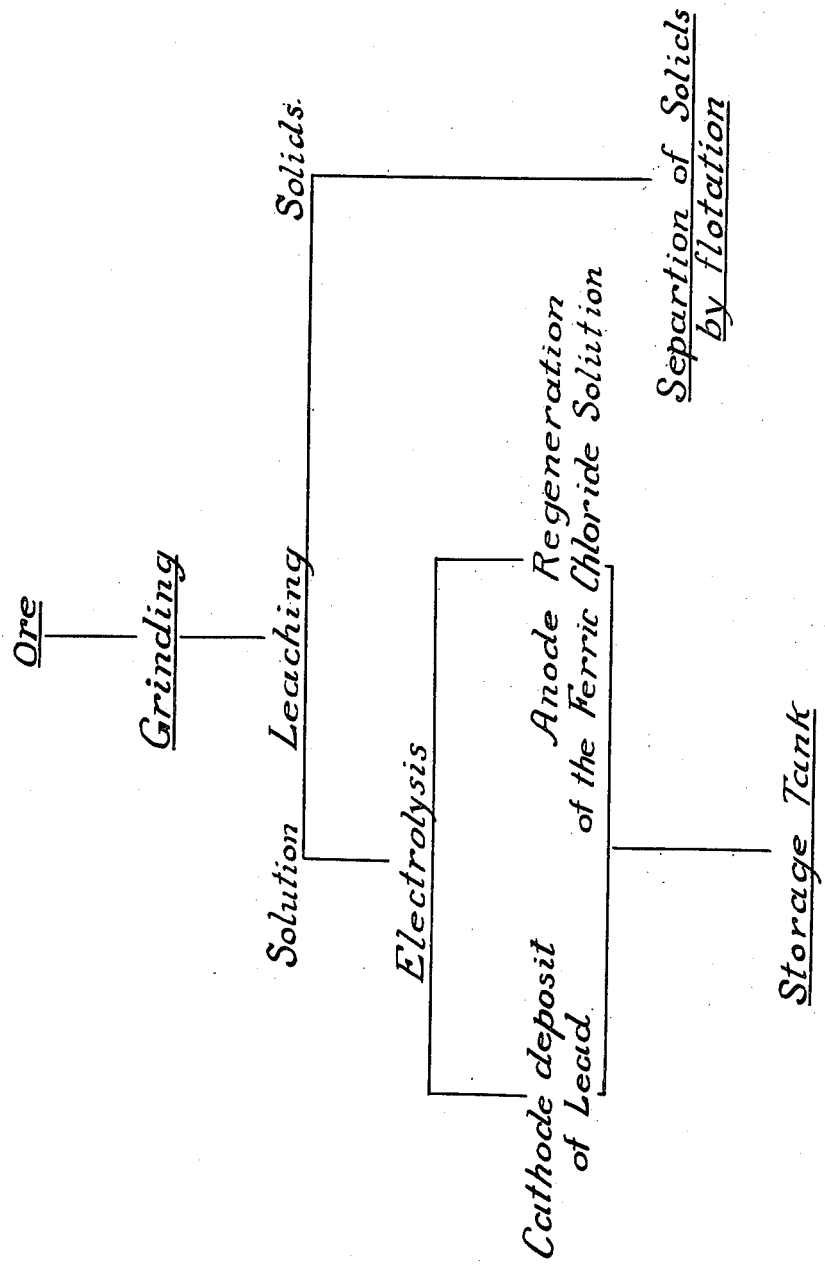

WILLIAM HENRY HANNAY, OF TRAIL, BRITISH COLUMBIA, CANADA, ASSIGNOR TO THE CONSOLIDATED MINING & SMELTING COMPANY OF CANADA, LIMITED, OF MONTREAL, QUEBEC, CANADA, A CORPORATION OF CANADA.

PROCESS FOR THE EXTRACTION OF LEAD FROM SULPHIDE ORES.

Application filed April 30, 1920, Serial No. 377,752. Renewed July 22, 1921. Serial No. 486,806.

*To all whom it may concern:*

Be it known that I, WILLIAM HENRY HANNAY, of the city of Trail, in the District of Kootenay and Province of British Columbia, Dominion of Canada, have invented a new and useful Process for the Extraction of Lead from Sulphide Ores; and I hereby declare the following to be a full, clear, and exact description of the same.

This invention relates to a process for the extraction of lead from sulphide ores, particularly those containing lead, iron, and zinc sulphides, the basis of the process being the conversion of lead sulphide to lead chloride in a ferric chloride solution in the presence of sodium chloride,—zinc sulphide being only slightly soluble, and iron sulphides being practically insoluble in this solution,—the reaction being as follows:

$$PbS + 2FeCl_3 = PbCl_2 + 2FeCl_2S$$

The solubility of the lead chloride in the solution varies directly with the heat of the solution used, but at a temperature between 60° and 70° F, which would be about the mean temperature employed, the solubility is between 10 and 12 grammes of lead in each litre of solution used, the solution being so regulated that the amount of lead in solution at the end of the operation does not exceed the above amount.

While the ferric chloride in the leaching solution reacts with the lead sulphide, converting it into lead chloride, the sodium chloride is the agent by which the lead chloride is held in solution.

In carrying out the process, four distinct but interdependent steps are involved,—grinding, leaching, electrolyzing the lead bearing solution with simultaneous regeneration of the ferric chloride, and the separation of the iron and zinc sulphides. Although the leaching and electrolyzing are of the most importance to the success of the operation, all of these steps will be more or less described in detail in the sequence in which they occur in the process.

Grinding.

To avoid subsequent dilution of the leaching solution, the grinding is preferably done in a neutral brine, such as sodium chloride from which the solids are separated, by standard methods of thickening and filtering, and then passed to the leaching solution.

The grinding, however, may be done in water, and in that case it will be advisable after thickening and filtering, to dry the solids before passing them to the leaching solution, as otherwise the leaching solution would in the course of time become unduly diluted.

Leaching.

After grinding in this manner, the solids are treated by standard leaching methods involving a thorough agitation of the solids with the leaching solution.

This solution is an approximately saturated solution of sodium chloride to which is added sufficient ferric chloride to react with the lead in the charge, a small excess of ferric chloride over the theoretical amount required for the reaction being advisable, and for this purpose about one half gramme per litre present at the end of the leach is sufficient, although an excess of this amount is not injurious to the success of the process.

The initial strength of the solution is such that the total chlorine in solution will be approximately 180 to 195 grammes per litre, of which, sufficient chlorine is present as ferric chloride to react with the lead sulphide in the charge, the balance of the chlorine being in combination as sodium chloride. The volume of the solution is so regulated with regard to the lead in the charge that on the completion of the leach, the lead in solution will not exceed 10 to 12 grammes per litre.

The ferric chloride reacts with the lead sulphide to form lead chloride and liberates elemental sulphur.

The extraction of lead is high, averaging well over 90% of the total lead sulphide content of the ore, and the rate of solution is rapid, less than one hour of leaching being required.

After leaching, the liquid is separated from the solids by standard methods of thickening, filtering and clarification.

The clarified solution then contains lead chloride, ferrous chloride, sodium chloride, a small amount of zinc chloride, and whatever ferric chloride was present in excess of the amount necessary to react with the lead sulphide.

Any iron going into solution is of course advantageous and reduces the amount of ferric chloride which must be otherwise supplied to make up for mechanical losses.

The only cumulative impurity is the zinc chloride which builds up slowly in the solution. None of the tests, however, has shown more than 2.25 grammes per litre, which can be removed from the solution during the electrolysis.

*Electrolysis.*

The electrolysis of the solution is conducted in a cell separated into anode and cathode compartments by diaphragms which, permitting of the passage of the current, prevent the mixing of the contents of these compartments except by diffusion.

The lead bearing solution is fed continuously to the cathode compartments where the lead is deposited and from where the lead free solution is returned and fed continuously to the anode compartments, and regenerated as ferric chloride simultaneously with the deposition of the lead. By this arrangement, only a small amount of chlorine is liberated at the anode, and this may be recovered, and by absorption in ferrous chloride converted into ferric chloride.

To eliminate the zinc chloride in the solution, the electrolysis may be continued after the solution in the cathode compartments is free from lead. A cathode deposit, consisting of a metallic alloy of iron and zinc, in sponge form, is then obtained, and the zinc in the system is eliminated.

*Flotation.*

The separation of the iron and zinc sulphides by flotation is conducted in an alkaline circuit, for the concentration of the zinc. The alkali may be any alkali such as calcium oxide, carbonate of soda, caustic soda, or caustic potash. With the alkalinity properly adjusted, a heavy, dense, zinc froth is produced, and only by excessive over oiling can any appreciable amount of iron be floated.

There being no insoluble chlorides formed, the complete removal of the chlorine from the zinc concentrates may be effected by washing, should this be necessary. A convenient method of doing so under commercial operating conditions, would be to subject the zinc concentrates to a thorough washing by counter current thickening followed by filtration.

The accompanying drawing shows a flow sheet illustrating the various steps in the process.

What I claim is—

1. A process for the extraction of lead from sulphide ores, which consists of grinding the ore in a neutral liquid, leaching it with ferric chloride in the presence of sodium chloride to dissolve the lead sulphide, electrolyzing the solution to deposit the lead with simultaneous regeneration of the ferric chloride, and washing the residue to remove the chlorine therefrom.

2. A process for the extraction of lead from sulphide ores, which includes the leaching of the ore with ferric chloride in the presence of sodium chloride to dissolve the lead sulphide, electrolyzing the solution to deposit the lead with simultaneous regeneration of the ferric chloride, and recovering the chlorine liberated during the electrolysis as ferric chloride.

3. A process for the extraction of lead from sulphide ores which consists of grinding the ore in a solution of sodium chloride, separating the solids from that liquid, leaching them with a solution of ferric chloride in the presence of sodium chloride, separating the solids from the ferric chloride solution, and electrolyzing this solution to deposite the lead.

4. A process for the extraction of lead from sulphide ores, which consists of grinding the ore in a neutral brine, leaching the solids with a solution of ferric chloride in the presence of sodium chloride, separating the solids from the ferric chloride solution, electrolyzing this solution to deposit the lead with simultaneous regeneration of the ferric chloride, and recovering the chlorine liberated during the electrolysis as ferric chloride.

5. A process for the extraction of lead from sulphide ores which consists of grinding the ore in a neutral brine, separating the solids from that liquid, leaching them with a solution of ferric chloride in the presence of sodium chloride, separating the solids from the ferric chloride solution, electrolyzing this solution to deposit the lead with simultaneous regeneration of the ferric chloride, and recovering the chlorine liberated during the electrolysis as ferric chloride.

Trail, B. C., March 23rd, 1920.

WILLIAM HENRY HANNAY.

Signed, sealed, and delivered in the presence of—

ANNIE MACKAY,
CHARLES H. RICHES.